United States Patent
Kawaura

(10) Patent No.: US 10,127,182 B2
(45) Date of Patent: Nov. 13, 2018

(54) IMAGE FORMING SYSTEM EXECUTING APPLICATION OCCUPATION OF AN APPLICATION AND USING BIDI SCHEMA

(71) Applicant: CANON KABUSHIKI KAISHA, Tokyo (JP)

(72) Inventor: Toshinori Kawaura, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/053,796

(22) Filed: Feb. 25, 2016

(65) Prior Publication Data
US 2016/0253138 A1  Sep. 1, 2016

(30) Foreign Application Priority Data

Feb. 27, 2015 (JP) ................... 2015-039430

(51) Int. Cl.
| | |
|---|---|
| G06F 3/12 | (2006.01) |
| G06F 13/42 | (2006.01) |
| G06F 13/20 | (2006.01) |
| G06F 9/52 | (2006.01) |

(52) U.S. Cl.
CPC ............ *G06F 13/4282* (2013.01); *G06F 9/52* (2013.01); *G06F 13/20* (2013.01); *G06F 3/121* (2013.01); *G06F 3/1224* (2013.01)

(58) Field of Classification Search
CPC ...... G06F 3/1239; G06F 3/121; G06F 3/1276; G06F 13/20; G06F 13/4282; G06F 9/52; G06F 3/1224

USPC ................... 358/1.13, 1.15; 399/8
See application file for complete search history.

(56) References Cited

U.S. PATENT DOCUMENTS

| | | | | |
|---|---|---|---|---|
| 6,047,323 A * | 4/2000 | Krause | ............... | G06F 9/4426 709/201 |
| 2011/0102838 A1* | 5/2011 | Watanabe | ............. | G06F 3/1203 358/1.15 |
| 2011/0213874 A1* | 9/2011 | Layton | ................ | G06F 11/0709 709/224 |
| 2011/0216346 A1* | 9/2011 | Takamoto | ................ | G06F 3/12 358/1.14 |
| 2013/0067120 A1 | 3/2013 | Forrest, III | | |
| 2013/0208298 A1* | 8/2013 | Morimoto | ............. | G06F 3/1209 358/1.14 |

FOREIGN PATENT DOCUMENTS

JP  2013-171403 A  9/2013

* cited by examiner

*Primary Examiner* — Eric A Rust
(74) *Attorney, Agent, or Firm* — Canon U.S.A., Inc. IP Division

(57) ABSTRACT

An information processing apparatus executes occupation processing so that an application that issues an occupation request is able to execute at least one of processing for acquiring information from a peripheral device and processing for transmitting information to the peripheral device, and that another application is not able to execute processing for acquiring information from the peripheral device and processing for transmitting information to the peripheral device.

21 Claims, 11 Drawing Sheets

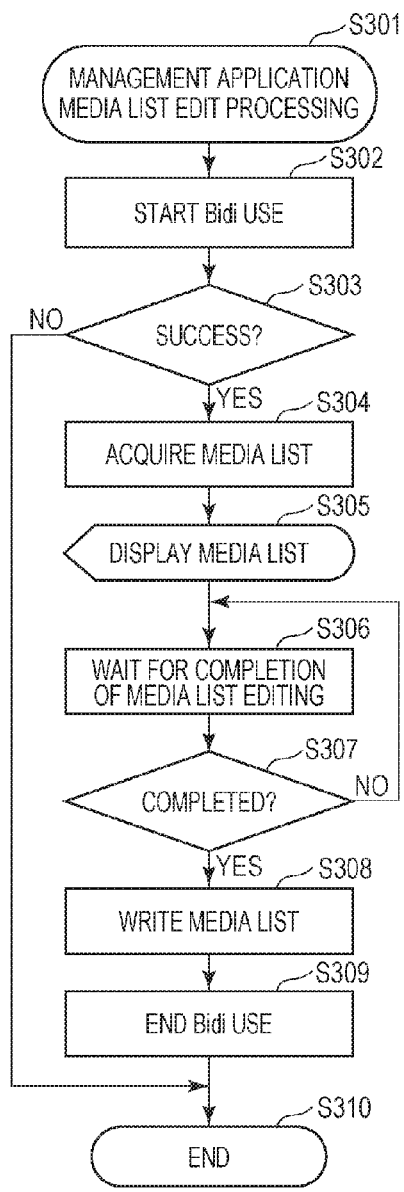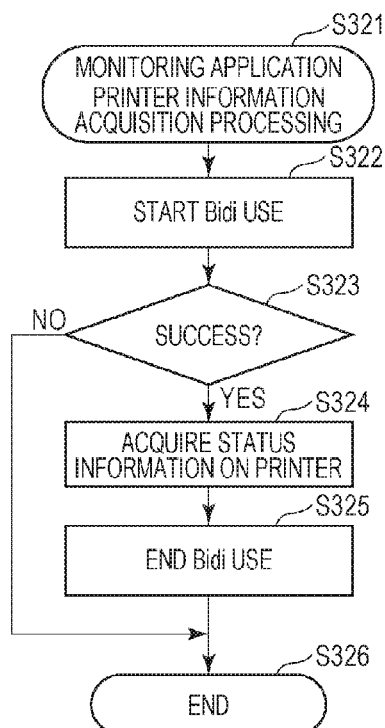
FIG. 3A
FIG. 3B

FIG. 5

```
<?xmlversion='1.0'?>
<bidi:Schemaxmlns:bidi="http://schemas.microsoft.com/windows/2010/09/printing/usbbidi">
  <Property name='Printer'>
    <Property name='BidiControl'>
      <Value name="ExclusiveAccessON"type="BIDI_STRING"accessType="Set"/>
      <Value name="ExclusiveAccessOFF"type="BIDI_STRING"accessType="Set"/>
    </Property>
    <Property name="Extension">
      <Value name="SetData"type="BIDI_STRING"accessType="Set"/>
      <Value name="GetData"type="BIDI_STRING"accessType="Get"/>
    </Property>
  </Property>
</bidi:Schema>
```

FIG. 6A

```
<!--Media List Request Command-->
<command targetdevice="printer">
    <action type="datarequest">
        <data id="1">MediaList</data>
    </action>
</command>
```

FIG. 6B

```
<!--Printer Status Request Command-->
<command targetdevice="printer">
    <action type="datarequest">
        <data id="1">StatusInformation</data>
    </action>
</command>
```

FIG. 6C

```
<!--Set Media Information Command -->
<command targetdevice="printer">
    <action type="dataadapt">
        <data type="media">
            <id>00000001</id>
            <name>plain paper</name>
            <param><![CDATA[drawing parameter]]></param>
        </data>
    </action>
```

FIG. 6D

```
<!--Media List Response Command-->
<command response="printer">
    <mediatypelist>
        <media id="1">
            <id>00000001</id>
            <name>plain paper</name>
            <param><![CDATA[drawing parameter1]]></param>
        </media>
        ...
        <media id="n">
            ...
        </media>
    </mediatypelist>
</command>
```

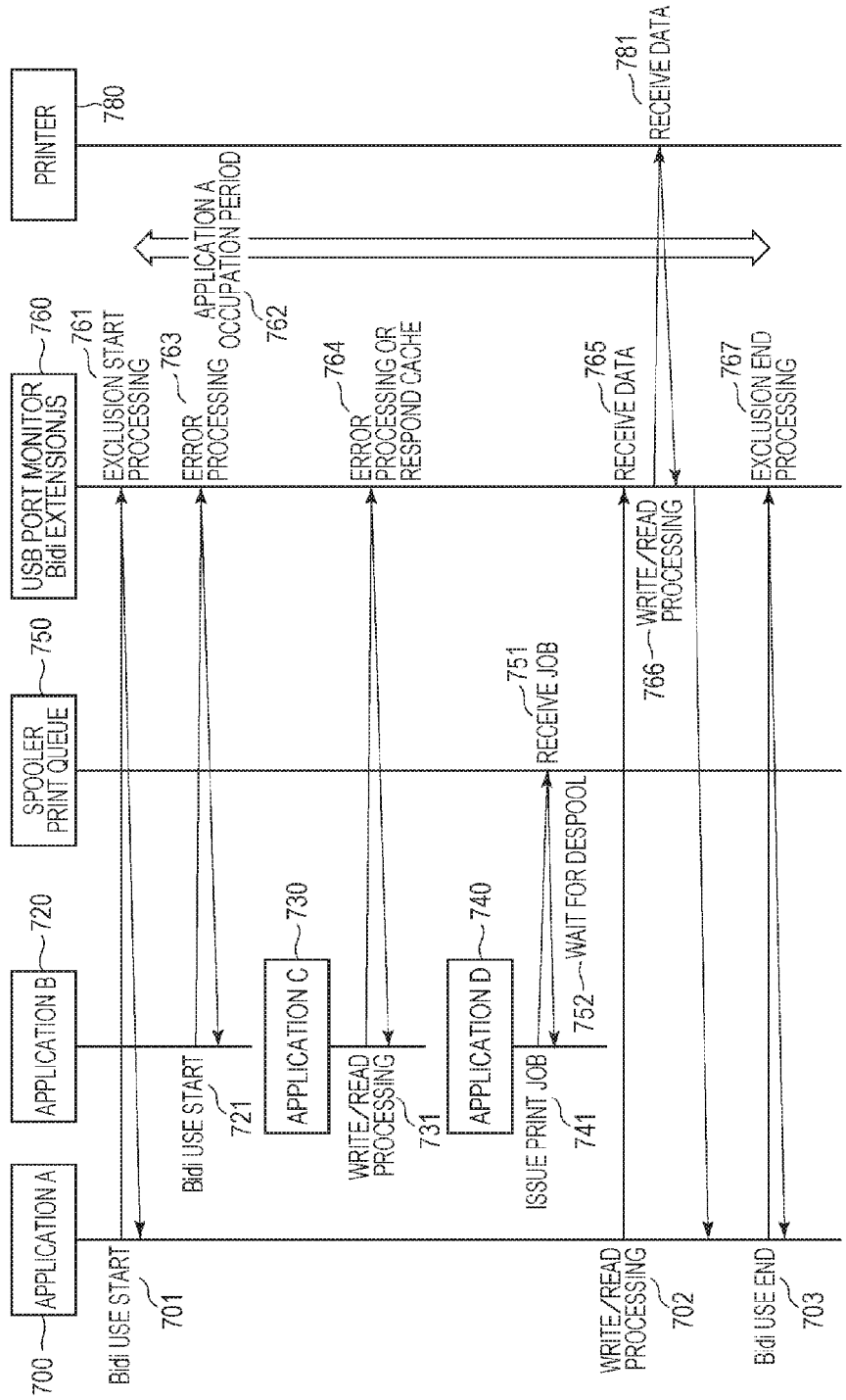

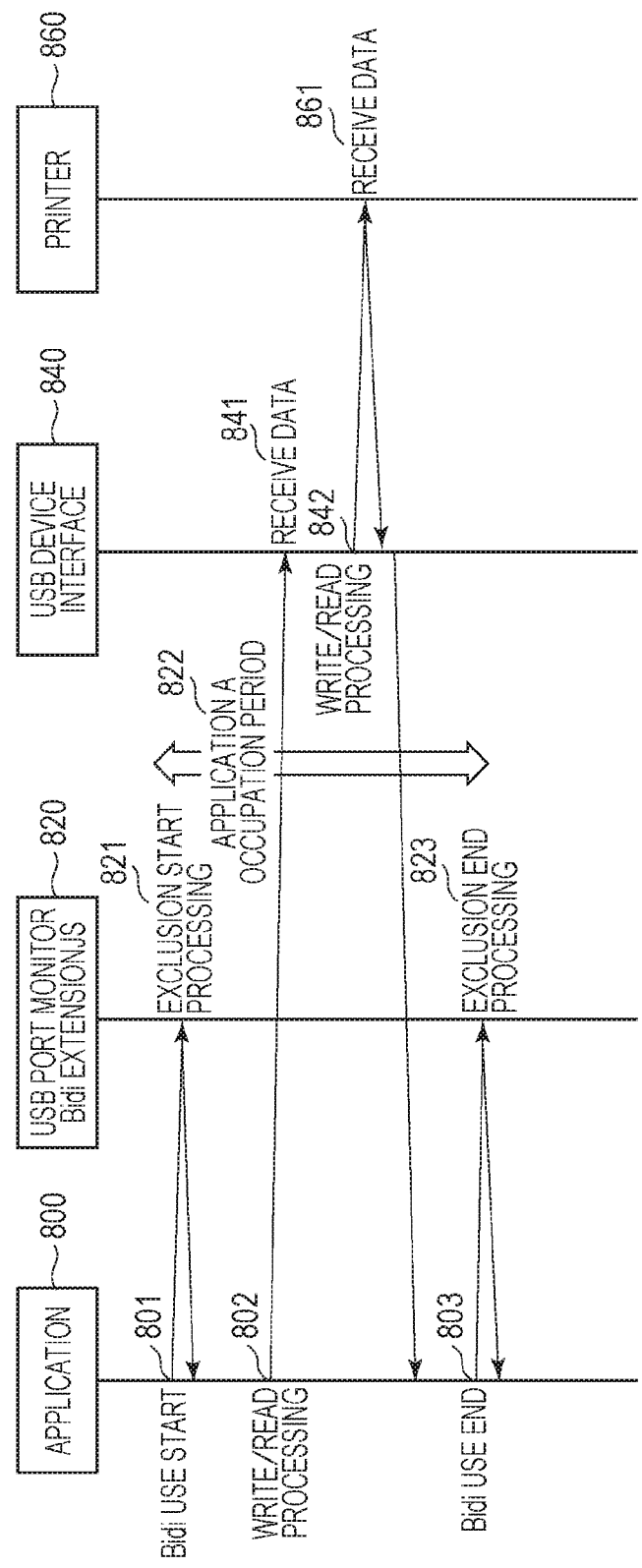

IMAGE FORMING SYSTEM EXECUTING APPLICATION OCCUPATION OF AN APPLICATION AND USING BIDI SCHEMA

BACKGROUND OF THE INVENTION

Field of the Invention

One disclosed aspect of the embodiments relates to an information processing apparatus, control method, and storage medium for transmitting and receiving various pieces of information between the information processing apparatus and a peripheral device.

Description of the Related Art

In conventional printer driver (v3 printer driver) architecture, a vendor is able to provide a bi-directional control module called language monitor. The language monitor is able to control transmission and reception of print jobs, and to control information writing and acquisition request from various applications to a printer. It is also possible to use an interprocess communication technique of the language monitor and the application using a Bidirectional (Bidi) schema for the information writing and acquisition request. Since the language monitor processes the interprocess communication using the Bidi schema in the v3 printer driver architecture, the vender is able to control information transmission and reception without restriction.

In recent years, a standard information transmission and reception method using the Bidirectional (Bidi) schema according to a next-generation printer driver (v4 printer driver) architecture has been established. In this next-generation v4 printer driver architecture exists no language monitor, which may inhibit unrestricted information transmission and reception control. U.S. patent publication No. 2013/0067120 describes a standard information transmission and reception method using the Bidi schema. In particular, U.S. patent publication No. 2013/0067120 discloses that a port monitor of an operating system (OS) reads external dependent files called Bidi extension file and Bidi extension JavaScript (registered trademark) (Bidi extension JS) file which are included in the printer driver. These external dependent files implement information transmission and reception specifications unique to each printer vendor that develops the printer driver.

However, U.S. patent publication No. 2013/0067120 lacks consideration about a problem that, while a certain software program is executing information transmission and reception processing using the Bidi schema, interruptions of information transmission and reception occur using the Bidi schema from another software program. As a result, processing intended by a user may not be executed.

SUMMARY OF THE INVENTION

In order to solve problems described above, an information processing apparatus of this application is an information processing apparatus having an operating system restricting a display of a print setting screen by a printer driver and allowing a print application related to the printer driver to display the print setting screen. The information processing apparatus includes: a reception unit configured to receive an occupation request from the application; and an execution unit configured to execute occupation processing in an occupation period based on the occupation request, so that the application that issues the occupation request may, or is able to, execute at least one of processing for acquiring information from a peripheral device and processing for transmitting information to the peripheral device, and that an application different from the application that issues the occupation request may not, or is not able to, execute processing for acquiring information from the peripheral device and processing for transmitting information to the peripheral device. Further features of the disclosure will become apparent from the following description of exemplary embodiments (with reference to the attached drawings).

Further features of the disclosure will become apparent from the following description of exemplary embodiments (with reference to the attached drawings).

BRIEF DESCRIPTION OF THE DRAWINGS

FIGS. 3A and 3B are flowcharts illustrating information acquisition processing of an application.

FIG. 5 is a diagram illustrating a Bidi extension schema definition file.

FIGS. 6A to 6D are diagrams illustrating a command.

FIG. 7 is a sequence diagram illustrating an overall processing flow.

FIG. 8 is a sequence diagram illustrating an overall processing flow.

DESCRIPTION OF THE EMBODIMENTS

Preferred exemplary embodiments of the disclosure will be described in detail below with reference to the accompanying drawings. It is to be noted that the following exemplary embodiments are not intended to limit the disclosure that falls within the scope of the appended claims, and all the combinations of features described in the present exemplary embodiment are not necessarily essential to solutions of the disclosure.

<First Exemplary Embodiment>

Figure 1:
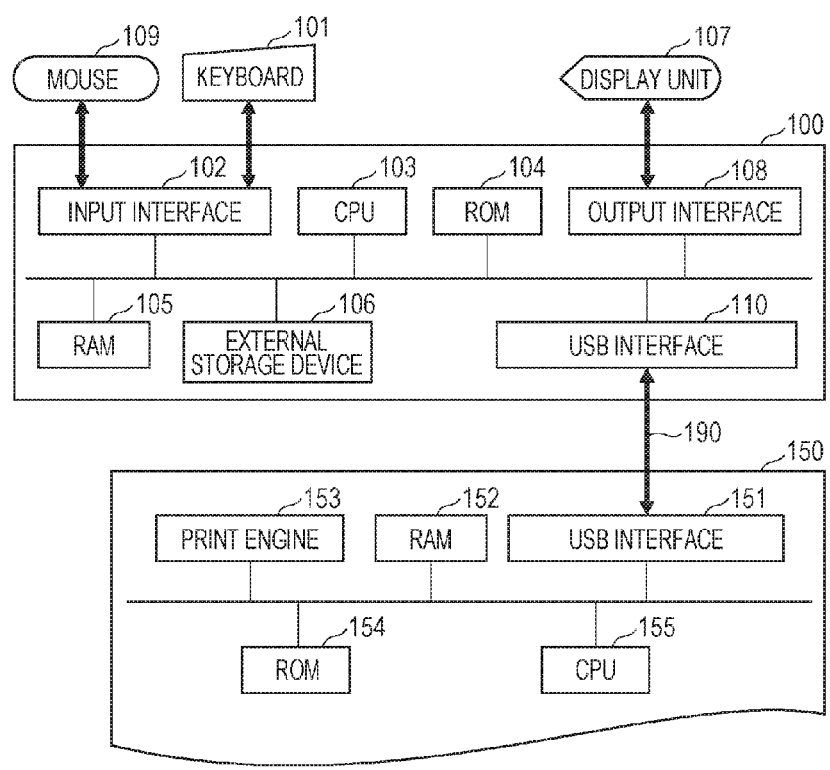
FIG. 1 is a configuration diagram of a printer and an information processing apparatus.

The configuration of a printer and an information processing apparatus according to the present exemplary embodiment will be described with reference to FIG. 1.

An information processing apparatus 100 includes an input interface 102, a CPU 103, a ROM 104, a RAM 105, an external storage device 106, an output interface 108, a display unit 107, a keyboard 101, a mouse 109, and a USB interface 110. The information processing apparatus 100 is capable of communicating with a printer 150 to be described later via the USB interface 110 and a USB cable 190. The ROM 104 stores an initialization program, and the external storage device 106 stores an application program group, OS (Operating System), printer driver, and various kinds of data. The RAM 105 is used as a work memory by various programs stored in the external storage device 106. The printer 150 includes a USB interface 151, a RAM 152, a print engine 153, a ROM 154, and a CPU 155. The printer 150 is capable of communicating with the information processing apparatus 100 via the USB interface 151 and the USB cable 190. The RAM 152 is used as a main memory and a work memory for the CPU 155, and stores a receiver buffer for temporarily storing received print data and various kinds of data. The print engine 153 does printing based on the data stored in the RAM 152. While this example indicates processing assigned to the information processing apparatus 100 and processing assigned to the printer 150 as described above, the assignment may not be particularly limited to this form, but may be another form.

Figure 2:
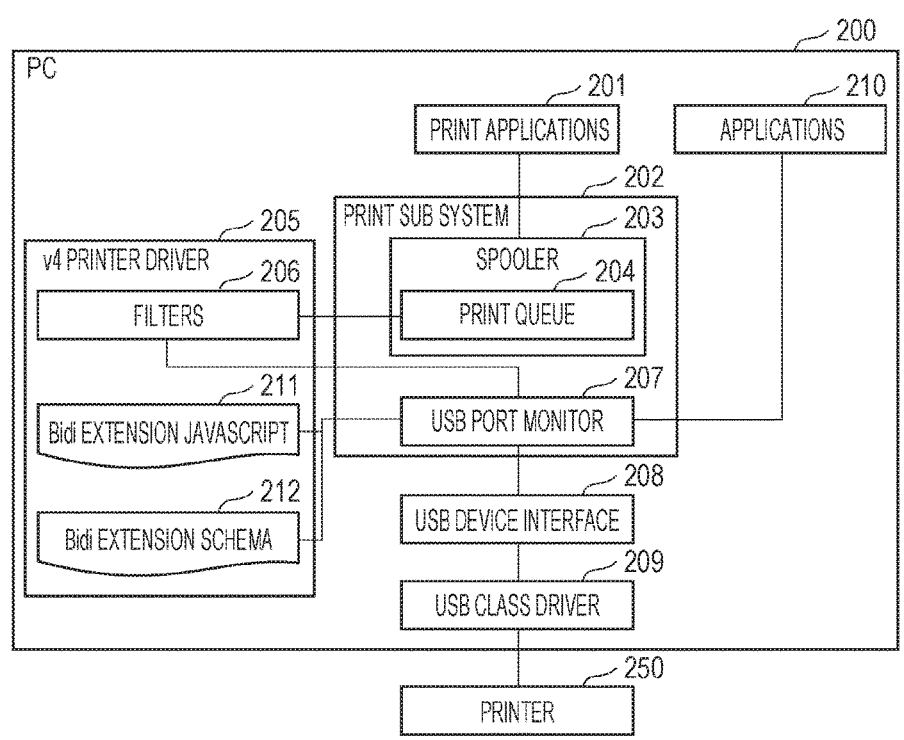
FIG. 2 is a block diagram illustrating a configuration of a printer driver and a print sub system of OS.

FIG. 2 is a block diagram illustrating the configuration of the printer driver and a print sub system of the OS stored in the external storage device 106. The information processing apparatus 100 (PC 200) is capable of communicating with the printer 250 via the USB cable.

First, a data flow until the print data moves from the PC 200 to the printer 250 will be described with reference to the block diagram of FIG. 2. Print applications 201 use an API provided by the OS for performing a print instruction to request the OS to perform print processing. Print jobs issued in response to the print processing request are processed by a spooler 203 of a print sub system 202 within the OS. The spooler 203 stores in a print queue 204 the print jobs issued from the print applications 201. The spooler 203 stores the plurality of print jobs from the plurality of print applications 201 within the PC 200 in the print queue 204. The spooler 203 transmits sequentially the print jobs stored in the print queue 204 to a v4 printer driver 205 (hereinafter referred to as printer driver). Here, processing of the spooler 203 transmitting the print data to the printer driver 205 for converting the print jobs into the print data that may be interpreted by the printer 250 is referred to as despool processing. On receipt of the print data, the printer driver 205 performs page configuration processing and command generation processing in accordance with various filters 206. The aforementioned page configuration processing refers to processing for rearranging page sequence within one piece of print data, and processing for arranging a plurality of pages in a physical page corresponding to one surface of paper, based on print setting information instructed from the print applications 201. The aforementioned command generation processing refers to processing for converting the print jobs into the print data that may be interpreted by the printer 250. When processing for converting the print jobs with various filters 206 into the print data is completed, the printer driver 205 passes the print data to a USB port monitor 207 within the print sub system 202. Subsequently, the USB port monitor 207 transfers the print data to the printer 250 via a USB device interface 208 and a USB class driver 209.

Next, movement of data in which applications 210 within the PC 200 write information into the printer 250 or read information from the printer 250 without using the print jobs will be described with reference to the block diagram of FIG. 2. The applications 210 use an API (Bidi interface) provided by the OS to access the printer 250. The Bidi interface is an interface for the OS and the applications 210 to perform bi-directional communication via setting information configured in XML called Bidi schema. The USB port monitor 207 within the OS that receives the Bidi schema via the Bidi interface from the applications 210 specifies and calls a function of a Bidi extension JS 211 of the printer driver 205 in accordance with a Bidi extension schema definition file 212. Here, the Bidi extension JS is an abbreviation for Bidi extension JavaScript (registered trademark). In order to transmit the Bidi schema to the USB port monitor, the applications 210 designate identification information of applicable printer 250 to the Bidi API. The USB port monitor is able to perform processing by using the Bidi extension schema definition file 212 of the printer driver 205 for the printer 250 corresponding to the designated identification information. When calling the function of the Bidi extension JS 211, the USB port monitor 207 passes the Bidi schema received from the applications 210 to the Bidi extension JS 211. At this time, the USB port monitor 207 also passes an object to the Bidi extension JS 211. Based on the called function, the Bidi schema, and the object, the Bidi extension JS 211 feeds back to the USB port monitor 207 an instruction of writing and reading processing of information to the printer 250. By requesting the Bidi extension JS 211 to interpret the Bidi extension schema definition file 212, the USB port monitor 207 may deal with vendor unique Bidi schema specifications. The USB port monitor 207 executes processing in accordance with the instruction fed back from the Bidi extension JS 211. Specifically, in accordance with the instruction fed back from the Bidi extension JS 211, the USB port monitor 207 performs writing and reading processing of information to the printer 250 via the USB device interface 208 and the USB class driver 209. An exclusion processing, which is one of features of this application, is also executed by the USB port monitor 207 in accordance with the instruction fed back from the Bidi extension JS 211.

FIG. 2 of this application is an example of a new print system to be implemented on a new operating system (OS). The new print system has several restrictions. For example, the v4 printer driver is not allowed to have a print setting screen. Accordingly, the print setting screen of the v4 printer driver is not called from the OS. Therefore, the print setting screen is provided by the OS. In addition, when a user configures print setting information that is more detailed than the print setting screen provided by the OS, the user instructs detailed setting in the print setting screen of the OS. Reception of this instruction leads to display of the print setting screen included in a print setting application compatible with the selected v4 printer driver. Here, the print setting screen of the print setting application allows selection of the print setting information that is more detailed than the print setting screen provided by the OS. For example, the print setting screen of the print setting application accepts settings of the print setting information about a setting item that may not be set in the print setting screen provided by the OS. The print setting application is downloaded into the information processing apparatus in conjunction with download of the v4 printer driver. Association of the v4 printer driver with the print setting application by using the identification information enables display processing of the aforementioned print setting screen. Here, the print setting application may operate as the applications 210. Another restriction is that an operation of a language monitor is not allowed in the new print system implemented on the new operating system (OS). That is, the OS does not call the print setting screen of the v4 printer driver, and the print application related to the printer driver calls the print setting screen. In addition, the OS does not call the language monitor. FIG. 3A is a flowchart illustrating media list edit processing of a management application. The management application corresponds to one of the applications 210 illustrated in FIG. 2, and is an application that manages information on print media supported by the printer 250. Here, the flowchart to be executed by the information processing apparatus of this application is implemented by the CPU 103 reading and executing a program on the flowchart from a memory such as a ROM, RAM, and external storage device.

When starting media list edit processing (S301), the management application starts Bidi interface use (S302). The management application determines (S303) a processing result of the Bidi interface use start (S302). When the result is a failure, the management application ends the media list edit processing (S310). When the result of the determination S303 is a success, the management application executes media list acquisition processing (S304).

Although specific processing will be described in FIG. 7, in S302, the management application requests to occupy and use the USB port monitor and the Bidi extension JS (760). When a reply to the request is an error, the determination in S303 is No. On the other hand, when the reply to the request is not an error, the determination in S303 is Yes. This results in that the management application may use the USB port monitor and the Bidi extension JS with priority, and thus interruptions from other applications, which is a problem this application assumes, may be prevented.

The management application displays the media list obtained in processing S304 on the display unit 107 of the information processing apparatus 100 (S305), and the user refers to information thereof to perform editing work of the media list. The management application waits for completion of the media list editing by the user (S306), and determines whether the user instructs completion of the editing work (S307). When the management application determines that the editing is completed because the user instructs completion of the editing work, the management application executes processing for writing the edited media list in the printer 250 (S308). Subsequently, the management application performs Bidi interface use end processing (S309), and ends the media list edit processing (S310). Although specific processing will be described in FIG. 7, processing in S309 cancels an occupation period of the USB port monitor and the Bidi extension JS by the management application.

FIG. 3B is a flowchart illustrating processing of a monitoring application acquiring status information of the printer 250. The monitoring application corresponds to one of the applications 210 illustrated in FIG. 2, acquires the status information on the printer 250 regularly, and displays the status on the display unit 107 of the information processing apparatus 100.

When starting processing (S321) for acquiring information on the printer 250, the monitoring application starts Bidi interface use (S322). The monitoring application determines (S323) a processing result of the Bidi interface use start (S322). When the result is a failure, the monitoring application ends the processing for acquiring the status information on the printer 250 (S326). When the result of the determination S323 is a success, the monitoring application executes processing for acquiring the status information on the printer 250 (S324). Subsequently, the monitoring application performs Bidi interface use end processing (S325), and ends processing for acquiring the status information on the printer 250 (S326).

Although this application continues description using the management application and the monitoring application, the aforementioned print setting application may be used.

Here, details of the Bidi extension schema definition file 212 that describes vendor unique schema specifications will be described with reference to FIG. 5. As illustrated in FIG. 5, the Bidi extension schema definition file 212 is described in XML markup language. The Bidi extension schema definition file illustrated in FIG. 5 indicates a state in which schemas called ExclusiveAccessON, ExclusiveAccessOFF, SetData, and GetData are defined as Valuenames. With the Bidi schema of ExclusiveAccessON, the Bidi extension JS 211 and the USB port monitor 207 of the OS are occupied by an application that issues the Bidi schema of ExclusiveAccessON. Therefore, the Bidi schema of ExclusiveAccessON may be referred to as an occupation request. In addition, with the Bidi schema of ExclusiveAccessOFF, the Bidi extension JS 211 and the USB port monitor 207 of the OS end occupation processing. Therefore, the Bidi extension JS 211 and the USB port monitor 207 of the OS may be referred to as an occupation end request.

The ExclusiveAccessON schema is defined with a Value type being a BIDI_STRING type, an accessType being Set, and a schema path being \\Printer\BidiControl:ExclusiveAccessON. ExclusiveAccessON is a schema designated as the Bidi interface to be used when the Bidi interface use start processing (S302, S322) is executed. The ExclusiveAccessOFF schema is defined with a Value type being a BIDI_STRING type, an accessType being Set, and a schema path being \\Printer\BidiControl:ExclusiveAccessOFF. ExclusiveAccessOFF is a schema designated as the Bidi interface to be used when the Bidi interface use end processing (S309, S325) is executed. The SetData schema is defined with a Value type being a BIDI_STRING type, an accessType being Set, and a schema path being \\Printer\Extension:SetData. SetData is a schema to be used when request information is written in the printer 250 in the media list acquisition processing (S304), media list writing processing (S308), and status information acquisition processing (S324) of the printer 250. This SetData schema is designated as the Bidi interface for the aforementioned processing. By using the SetData schema, commands illustrated in FIG. 6 including a media list request command (FIG. 6A), printer 250 status information request command (FIG. 6B), and media information setting command (FIG. 6C) may be written in the printer 250. The GetData schema is defined with a Value type being a BIDI_STRING type, an accessType being Get, and a schema path being \\Printer\Extension:GetData. GetData is a schema to be used when response information is acquired from the printer 250 in the media list acquisition processing (S304), media list writing processing (S308), and status information acquisition processing (S324). This GetData schema is designated as the Bidi interface for the aforementioned processing. After the media list request command of FIG. 6A is written in the printer 250 with the SetData schema, media list response information as illustrated in FIG. 6D may be acquired from the printer 250 by using the GetData schema. Although only the schemas necessary for description of the present exemplary embodiment are described here, it is needless to say that, for example, a schema for acquiring capability information on the printer, etc. needs to be defined according to other functions.

Figure 4A:
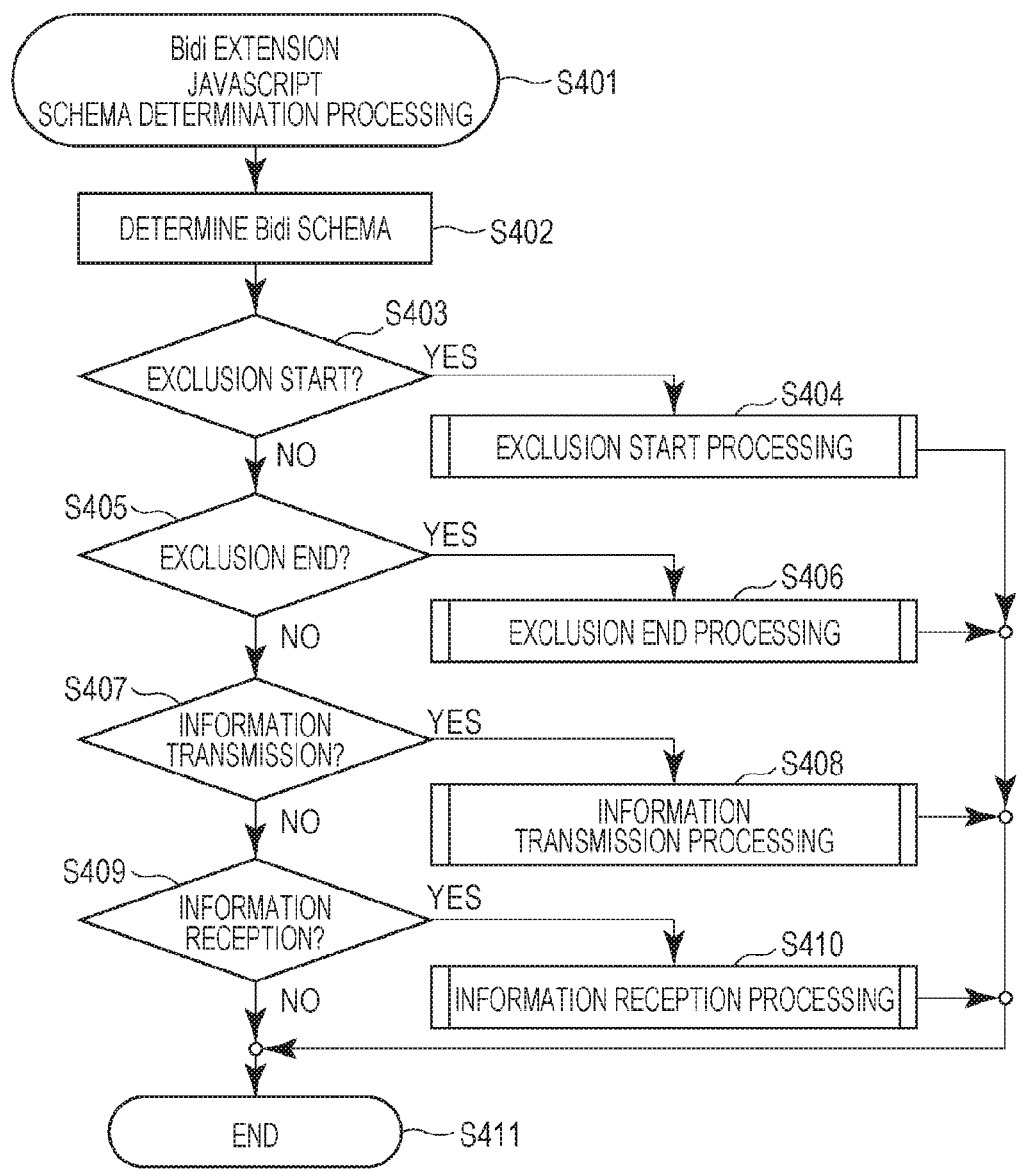
FIGS. 4A to 4E are flowcharts illustrating processing of Bidi extension JS.

FIG. 4A is a flowchart illustrating schema determination processing performed by the Bidi extension JS 211 called by the USB port monitor 207 that receives the schema by the Bidi interface. The OS is unable to understand the Bidi schema received from the applications. Therefore, when calling the function of the Bidi extension JS 211, the USB port monitor 207 passes both the object and the Bidi schema received from the applications 210 to the Bidi extension JS 211. This processing causes processing of FIGS. 4A to 4E to be started.

When starting schema determination processing (S401), the Bidi extension JS 211 determines a schema name (Value name) of the received schema (S402). The Bidi extension JS 211 determines (S403) whether the schema name determined in S402 is exclusion start (ExclusiveAccessON). When a result of the determination (S403) is Yes, the Bidi extension JS 211 executes exclusion start processing (S404) and then ends processing (S411). Details of S404 will be described in FIG. 4B. When a result of the determination (S403) is No, the Bidi extension JS 211 determines (S405) whether the schema name is exclusion end (ExclusiveAccessOFF). When a result of the determination (S405) is Yes, the Bidi extension JS 211 executes exclusion end processing (S406) and then ends processing (S411). Details of S406 will be described in FIG. 4C. When a result of the determination (S405) is No, the Bidi extension JS 211 determines (S407) whether the schema name is information transmission (Set-Data). When a result of the determination (S407) is Yes, the Bidi extension JS 211 executes information transmission processing (S408) and then ends processing (S411). Details of S408 will be described in FIG. 4D. When a result of the determination (S407) is No, the Bidi extension JS 211 determines (S409) whether the schema name is information reception (GetData). When a result of the determination (S409) is Yes, the Bidi extension JS 211 executes information reception processing (S410) and then ends processing (S411). Details of S410 will be described in FIG. 4E. When a result of the determination (S409) is No, the Bidi extension JS 211 ends processing (S411).

Figure 4B:
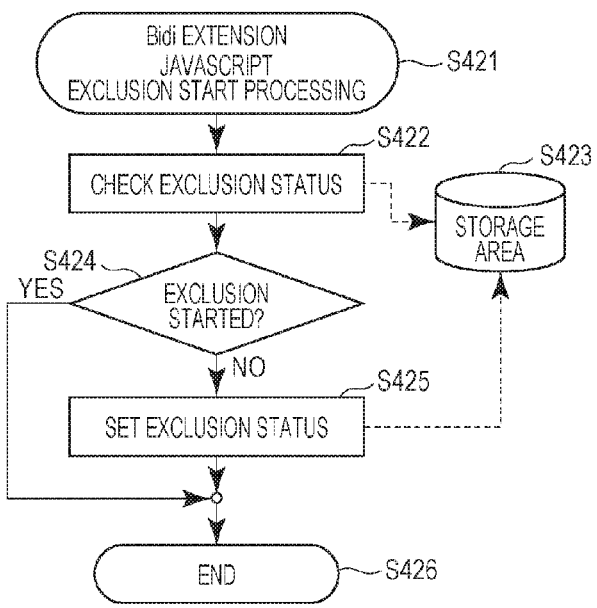

FIG. 4B is a flowchart illustrating details of the exclusion start processing (S404) by the Bidi extension JS 211.

When starting exclusion start processing (S421), the Bidi extension JS 211 refers to a storage area (S423) to check an exclusion status (S422). Processing (S422) is specifically implemented by the Bidi extension JS referring to information passed from the OS. The information passed from the OS may be a property that indicates the exclusion status included in the object passed from the OS, and may be information obtained from a result of executing a method included in the object.

As described above, processing of FIGS. 4B to 4E is implemented when the USB port monitor 207 passes both the object and the Bidi schema received from the applications 210 to the Bidi extension JS 211 when the function of the Bidi extension JS 211 is called. That is, the Bidi extension JS 211 executes processing by using the object passed from the OS.

Hereinafter, in FIGS. 4B to 4E, processing executed using the object passed from the OS is represented as "processing via the object passed from the OS".

The Bidi extension JS 211 determines (S424) whether exclusion is already started, and when exclusion is already started, the Bidi extension JS 211 ends processing (S426). Here, when it is determined in S424 that exclusion is already started, information indicating that exclusion is already started is notified to the OS by the Bidi extension JS 211 as feedback. In response to this feedback, the OS notifies information indicating that exclusion is already started to the applications that issue the Bidi schema. When it is determined in the determination (S424) that exclusion is not yet started, the Bidi extension JS 211 sets the exclusion status (S425) in the storage area (S423) via the OS, and ends processing (S426). Here, the processing (S425) is processing via the object passed from the OS. That is, when it is determined in S424 that exclusion is not started (S424—No), the Bidi extension JS 211 instructs execution to an exclusion processing execution API of the OS so that the OS writes the exclusion status in the storage area. By this processing, the USB port monitor of the OS is occupied by the applications of an exclusion request source. The storage area also stores information regarding an exclusion start process (for example, process ID).

Figure 4C:
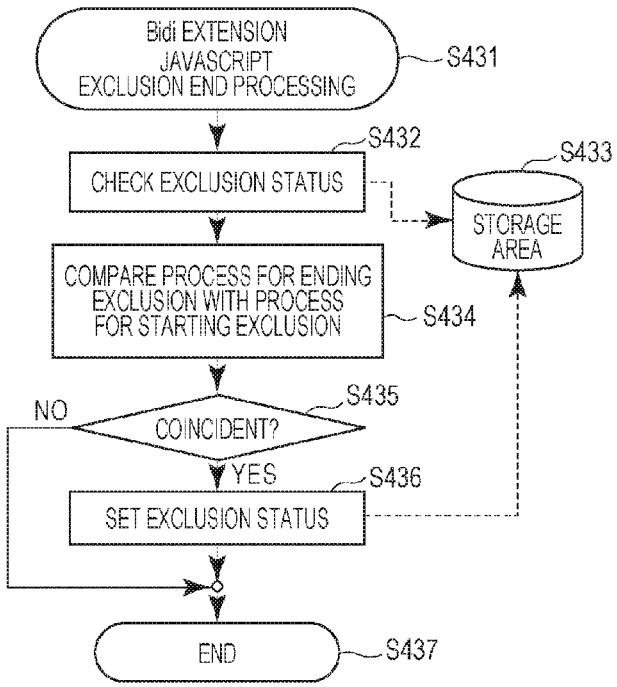

FIG. 4C is a flowchart illustrating details of the exclusion end processing (S406) of the Bidi extension JS 211.

When starting exclusion end processing (S431), the Bidi extension JS 211 refers to a storage area (S433) to check an exclusion status (S432). Here, processing (S432) is processing via the object passed from the OS.

The Bidi extension JS 211 compares (S434) a process for starting exclusion recorded in the storage area (S433) with a process for executing the exclusion end processing (S431), and determines coincidence (S435). Methods for identifying a process may include identification using the process ID of the application that calls the Bidi interface. Another identification method is identification using an ID that is set when the application sets a unique ID as one of parameters of the Bidi interface. That is, processing of S435 is determination processing whether an application of an occupation request source and an application of an occupation end request source are identical.

When it is determined as No in the determination (S435), the Bidi extension JS 211 ends processing (S437). When it is determined as No in S435, the Bidi extension JS 211 notifies the OS as feedback that the exclusion end processing fails. In response to this feedback, the OS notifies an issuer of the Bidi schema that the exclusion end processing fails.

When it is determined as Yes in the determination (S435), the Bidi extension JS 211 sets exclusion status information (S436) in the storage area (S433) to be deleted, and then ends processing (S437). Then, the OS deletes the exclusion status information in accordance with the settings made in S436. Here, processing (S436) is processing via the object passed from the OS. That is, when it is determined in S435 that the two processes are coincident (S435—Yes), the Bidi extension JS 211 instructs the exclusion processing execution API of the OS to end an occupation state, so that the OS deletes the exclusion status information. This processing cancels the occupation state of the USB port monitor 207 of the OS.

Figure 4D:
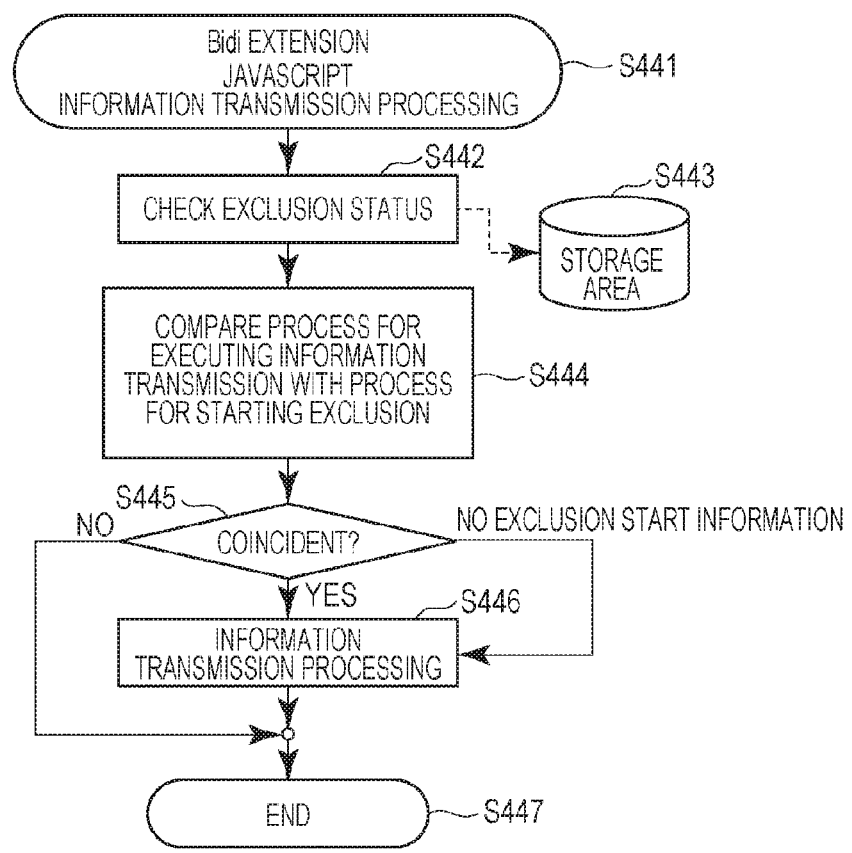

FIG. 4D is a flowchart illustrating details of the information transmission processing (S408) of the Bidi extension JS 211.

When starting information transmission processing (S441), the Bidi extension JS 211 refers to a storage area (S443) to check an exclusion status (S442). Here, processing (S442) is processing via the object passed from the OS. The Bidi extension JS 211 compares (S444) a process for starting exclusion recorded in the storage area (S443) with a process for executing the information transmission processing (S441), and determines coincidence (S445). Here, since the determination processing is similar to S435 of FIG. 4C, detailed description will be omitted. When it is determined as No in the determination (S445), the Bidi extension JS 211 ends processing (S447). When it is determined as No in S445, the Bidi extension JS 211 notifies the OS as feedback that the information transmission processing may not be performed due to the occupation state by other applications. In response to this feedback, the OS notifies the issuer of the Bidi schema that the information transmission processing may not be performed. When it is determined as Yes in the determination (S445), the Bidi extension JS 211 instructs the printer 250 to perform the information transmission processing (S446), and then ends processing (S447). That is, when it is determined in S445 that the two processes are coincident (S445—Yes), the Bidi extension JS 211 instructs the OS to execute the information transmission processing so that the OS executes information transmission to the printer. For example, the media list edited by the management application is transmitted to the printer. Here, processing (S446) is processing via the object passed from the OS. Even when the determination (S445) indicates that the exclusion start information does not exist in the storage area (S443), the Bidi extension JS 211 executes the information transmission processing (S446). This is a measure for applications that do not need to maintain the exclusion status in access processing to the printer 250.

Figure 4E:
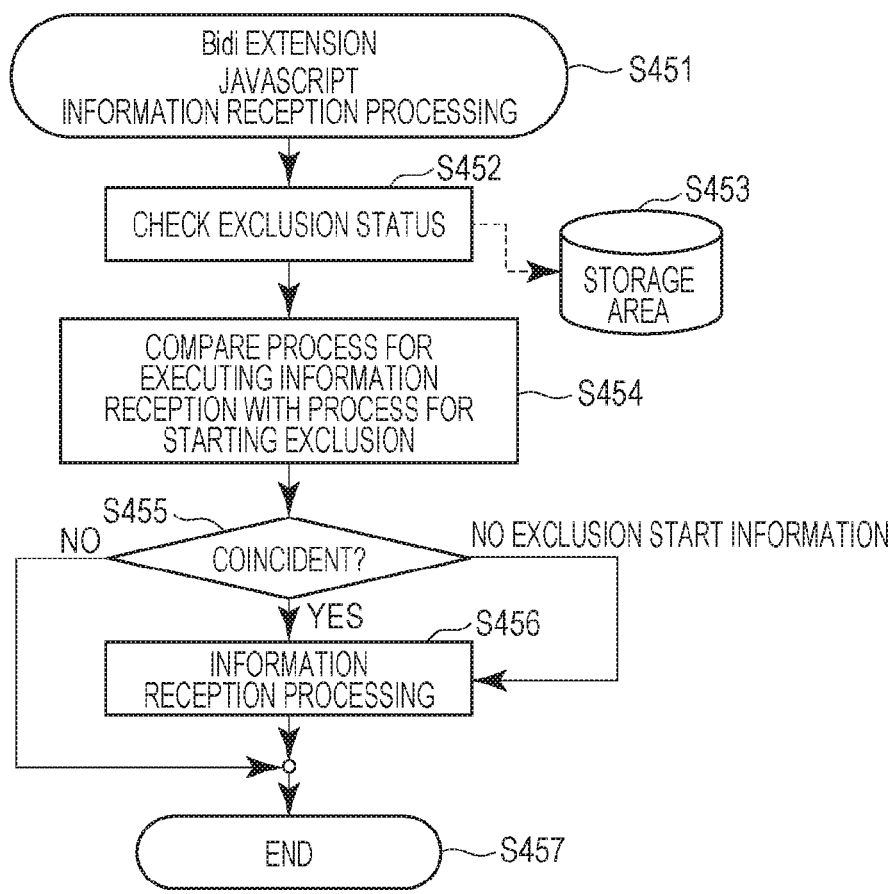

FIG. 4E is a flowchart illustrating details of the information reception processing (S410) of the Bidi extension JS 211.

When starting information reception processing (S451), the Bidi extension JS 211 refers to a storage area (S453) to check an exclusion status (S452). Here, processing (S452) is processing via the object passed from the OS. The Bidi extension JS 211 compares (S454) a process for starting exclusion recorded in the storage area (S453) with a process for executing the information reception processing (S451), and determines coincidence (S455). Here, since the determination processing is similar to S435 of FIG. 4C, detailed description will be omitted.

When it is determined as No in the determination (S455), the Bidi extension JS 211 ends processing (S457). When it is determined as No in S455, the Bidi extension JS 211 notifies the OS as feedback that the information reception processing fails due to the occupation state by other applications. In response to this feedback, the OS notifies the issuer of the Bidi schema that the information reception processing may not be performed. When it is determined as Yes in the determination (S455), the Bidi extension JS 211 instructs the printer 250 to execute the information reception processing (S456), and then ends processing (S457). That is, when it is determined in S455 that the two processes are coincident (S455—Yes), the Bidi extension JS 211 instructs the OS to execute the information reception processing so that the OS executes the information reception processing (acquisition processing) from the printer. For example, functional information on the printer and the status information on the printer are acquired. Here, processing (S456) is processing via the object passed from the OS. Even when the determination (S455) indicates that the exclusion start information does not exist in the storage area (S453), the Bidi extension JS 211 executes the information reception processing (S456). This is a measure for applications that do not need to maintain the exclusion status in access processing to the printer 250.

The processing of FIG. 4 causes the Bidi extension JS 211 to be occupied by the application 210 that transmits the Bidi schema, and the use of the Bidi extension JS 211 by other applications is restricted, which may solve the problem of this application.

FIG. 7 is a sequence diagram illustrating an overall processing flow of various applications, the OS, and the printer. With reference to FIG. 7, the following describes, while an application A occupies the USB port monitor 207 and the Bidi extension JS211, what kind of behavior other applications and spooler perform.

The application A (700) is, for example, the management application described with reference to FIG. 3A. The management application (700) executes the Bidi use start processing (701, S302). By the Bidi use start processing (701), the USB port monitor (760) receives an instruction of the exclusion start processing (S425) as feedback about the processing of FIG. 4 executed by the Bidi extension JS (760). As a result, the USB port monitor (760) executes the exclusion start processing (761). The Bidi extension JS responds to the management application (700) that the exclusion processing succeeds. Accordingly, the management application becomes an application of an occupation request source.

An application B (720) is, for example, the monitoring application described with reference to FIG. 3B. The monitoring application (720) executes Bidi use start processing (721, S322) in order to acquire the status information on the printer 250. Accordingly, the monitoring application makes a request for executing acquisition of the printer status information. However, the USB port monitor is in a USB port occupation period (762) by the management application (700). Therefore, the USB port monitor accepts that exclusion is executed as feedback about processing of FIG. 4 (determination that exclusion is started (S424—Yes)) executed by the Bidi extension JS (760). As a result, the USB port monitor performs response processing (763) of an occupation processing error to the monitoring application. The monitoring application (720) that receives the error response may display an error screen that indicates that the occupation fails. Alternatively, the monitoring application (720) may wait for an arbitrary certain period of time to retry the Bidi use start processing (721).

An application C (730) is one of the applications (210) that execute information transmission and reception using Bidi, and is an application that does not declare Bidi use start. The application C (730) executes write/read processing (731) using Bidi. However, the USB port monitor is in the USB port occupation period (762) by the management application (700). Therefore, the USB port monitor accepts that the USB port monitor may not transmit or receive information because the USB port monitor is excluded as feedback about processing of FIG. 4 (determination of not coincident in S445 or S455) executed by the Bidi extension JS (760). As a result, the USB port monitor performs error response processing (764) to the application C. At this time, when cache data of response information for information requested by the application C is already prepared, the USB port monitor (760) may respond the cache information to the application C (764). That is, the USB port monitor (760) determines whether the cache information is already stored. Furthermore, the Bidi extension JS (760) may determine whether to respond the cache information (764) in accordance with a type of Bidi schema that receives the write/read request. Specifically, when the Bidi schema is an acquisition request of capability information, the Bidi extension JS (760) determines to respond the cache information, and when the Bidi schema is an acquisition request of the status information, the Bidi extension JS (760) determines not to respond the cache information.

Alternatively, the Bidi extension schema definition file may describe definition of whether to respond the cache information (764), and the USB port monitor (730) may refer to the description to determine whether to respond the cache information (764). Accordingly, for example, when the application C issues the acquisition request of the capability information to the USB port monitor while the management application (700) already occupies the USB port monitor, the application C may acquire the cache information.

An application D (740) is one of the print applications (201). When the application D issues a print job in accordance with a user's print instruction (741), the spooler and print queue (750) receive the print job (751). However, since the USB port is in the occupation period (762) by the management application (700), the spooler (750) waits for despooling of the print job (752) until the occupation state of the USB port is canceled, and keeps the print job in the print queue.

While use of the USB port by the monitoring application (720), the application C (730), and despooling of the spooler (750) is restricted, the management application (700) executes write/read processing (702, S446, S456). The write/read processing (702, S446, S456) refers to the media list acquisition processing (S304) and the media list writing processing (S308). The management application (700), which is occupying the use of the USB port, may repeat write/read processing (702, S446/S456) multiple times. Moreover, there is no need for concern about interruptions by the print job or other applications. When repeating the write/read processing (702, S446/S456) multiple times, the management application (700) executes the Bidi use start processing (701, S302). On the other hand, when executing the write/read processing (702, S446/S456) only once, the management application (700) does not need to execute the Bidi use start processing (701, S302).

In response to the write/read processing (702, S446, S456) (765), the USB port monitor and the Bidi extension JS (760) execute the write/read processing (766) to the printer (780, 250). In response to a request for the write/read processing (766) from the USB port monitor (760, 207), the printer (780, 250) responds data for the request (781). When the request of the USB port monitor (760, 207) is the media list acquisition request illustrated in FIG. 6A, data to respond (781) is the media list response information illustrated in FIG. 6D. The response (781) from the printer (780, 250) is passed to the management application (700) through the USB port monitor and the Bidi extension JS (760). When the use of the Bidi interface ends, the management application (700) executes the Bidi use end processing (703, S309). By the Bidi use end processing (703), the USB port monitor and the Bidi extension JS (760) execute the exclusion end processing (767, S436), and cancel the USB port occupation period (762) by the management application (700). Then, the USB port monitor and the Bidi extension JS (760) respond to the management application (700) that the Bidi use end processing (703, S309) succeeds. Accordingly, the management application becomes the application of the occupation end request source.

As described above, declaration of the Bidi use start (701) enables the management application (700) to restrict various types of interruption processing (721, 731, 752). In addition, the exclusion end processing of 767 in FIG. 7 enables the application B to perform the Bidi use start processing, and the despool processing of the print job maintained in the print queue is started by the exclusion end processing of 767 in FIG. 7.

It is to be noted that a case may be considered in which the exclusion state ends before the application A (700) performs the Bidi use end processing (703). In preparation for the aforementioned case, as a first example, when there is no Bidi use by the application A (700) for a certain period of time, the USB port monitor (760, 207) may cancel the exclusion state. As a second example, on confirmation that the application A (700) does not exist on a PC, the USB port monitor (760, 207) may cancel the exclusion state. As a third example, when performing the Bidi use start processing (701), the application A (700) may perform processing for conveying a timeout (time limit of the occupation period) to the USB port monitor (760). At this time, the application A executes settings of the time limit of the occupation period in accordance with a user's instruction before the Bidi use start processing. Then, when exclusion processing time of the USB port monitor exceeds the timeout (predetermined time), even before receiving the exclusion end request from the application A, the USB port monitor ends the exclusion processing.

In addition, it is also considered that the information processing apparatus includes a plurality of v4 printer drivers. In this case, it is also considered that the application A designates the v4 printer driver A, and that the application B designates the v4 printer driver B. For example, even if the application B designates the v4 printer driver B and issues the Bidi schema in a situation where the application A is occupying the USB port monitor, the storage area stores that the USB port monitor is in the occupation state. As a result, as feedback about the Bidi schema issued from the application B, the v4 printer driver B notifies the OS that the exclusion fails. Accordingly, the USB port monitor will notify the application B that the exclusion fails, and as a result, the application A may occupy the USB port monitor.

<Second Exemplary Embodiment>

The first exemplary embodiment describes a method in which an application declares Bidi use start to prevent interruptions from other applications, and in the meantime the application performs write/read processing by using a Bidi interface. The second exemplary embodiment describes a method in which an application declares Bidi use start to prevent interruptions from other applications, and in the meantime the application performs write/read processing directly on a USB device interface 208.

FIG. 8 is a sequence diagram illustrating an overall processing flow of an application, an OS, and a printer. With reference to FIG. 8, the following describes a flow in which the application uses a USB device interface directly while the application occupies a USB port monitor 207 and the Bidi extension JS 211. The application (800) is, for example, the management application described with reference to FIG. 3A.

The management application (800) executes Bidi use start processing (801, S302). By the Bidi use start processing (801), the USB port monitor receives feedback from Bidi extension JS (820) that exclusion start processing (821, S425) succeeds. In response to this feedback, the USB port monitor responds to the management application (800) that the exclusion succeeds. By executing the exclusion start processing (821), the management application (800) provides a USB port occupation period (822).

While use of the USB port by other applications and despooling of a spooler is restricted, the management application (800) executes write/read processing (802). The write/read processing (802) is processing for opening the USB device interface (840, 208) and writing/reading data directly. In response (841) to the processing (802), the USB device interface (840, 208) performs write/read processing (842) on the printer (860, 250). In response to a request for the write/read processing (842) from the USB device interface (840, 208), the printer (860, 250) responds data for the request (861). Here, when the request from the USB device interface (840, 208) is the media list acquisition request illustrated in FIG. 6A, data to respond (861) is the media list response information illustrated in FIG. 6D. The response (861) from the printer (860, 250) is passed to the management application (800) through the USB device interface (840, 208). When use of the Bidi interface ends, the management application (800) executes Bidi use end processing (803, S309). By the Bidi use end processing (803), the Bidi extension JS (820) informs execution of exclusion end processing to the USB port monitor as feedback. In response to this feedback, the USB port monitor cancels the USB port occupation period (822) by the management application (800). Then, the USB port monitor (820) responds to the management application (800) that the Bidi use end processing (803, S309) succeeds.

As described above, declaration of the Bidi use start (801) allows the management application (800) to use the USB device interface while various interruption processes are restricted. As a result, applications different from the application 800 may not execute processing using the USB device interface via the USB port monitor and the Bidi extension JS 820, which may solve the problem of this application.

The disclosure allows processing intended by the user to be executed.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-039430, filed Feb. 27, 2015, which is hereby incorporated by reference herein in its entirety.

What is claimed is:

1. An information processing apparatus having an operating system, the information processing apparatus comprising:
   a processor; and
   a memory containing instructions that, when executed by the processor, cause the processor to perform operations comprising:
      a receiving operation to receive an occupation request associated with a definition file in the printer driver for an exclusive access to a peripheral device from a first application;
      a determining operation to determine whether the peripheral device is occupied by another application including a second application different from the first application, in a case where the occupation request associated with the definition file is received from the first application; and
      an executing operation to execute occupation processing in an occupation period based on the occupation request associated with the definition file if it is determined that the peripheral device is not occupied by the other application, so that the first application is able to execute at least one of processing for acquiring information from the peripheral device and processing for transmitting information to the peripheral device, and that the other application including the second application is not able to execute processing for acquiring information from the peripheral device and processing for transmitting information to the peripheral device,
      wherein the operating system stores identification information about the occupation processing in a storage area in a case where the occupation processing is executed,
      wherein in a case where identification information about an execution request to be issued by the first application for executing at least one of the processing for acquiring information from the peripheral device and the processing for transmitting information to the peripheral device coincides with the identification information stored in the storage area, processing based on the execution request issued by the first application is executed, and
      wherein in a case where identification information about an execution request to be issued by the other application including the second application does not coincide with the identification information stored in the storage area, processing based on the execution request issued by the other application is not executed.

2. The information processing apparatus according to claim 1, wherein the executing operation instructs a port monitor of the operating system to execute the occupation processing in the occupation period based on the occupation request, so that the first application is able to execute at least one of processing for acquiring information from the peripheral device and processing for transmitting information to the peripheral device, and that the second application is not able to execute processing for acquiring information from the peripheral device and processing for transmitting information to the peripheral device.

3. The information processing apparatus according to claim 1, wherein the executing operation executes the occupation processing in accordance with a Bidi schema corresponding to the occupation request transmitted from the first application, and an object transmitted from the operating system.

4. The information processing apparatus according to claim 1, wherein, on receipt of an occupation request from the second application in the occupation period, the executing operation transmits information that indicates an occupation processing error to the second application.

5. The information processing apparatus according to claim 1, wherein the operations further comprises a determining operation to determine, when an occupation end request is received, whether the first application issues the occupation end request,
   wherein, when the determining operation determines that the first application issues the occupation end request, the executing occupation processing cancels the occupation processing.

6. The information processing apparatus according to claim 5, wherein, when a predetermined time elapses after the occupation processing is executed, the executing operation cancels the occupation processing before receiving the occupation end request.

7. The information processing apparatus according to claim 1, wherein the operating system restricts a display of a print setting screen by a printer driver and allowing a print application related to the printer driver to display the print setting screen.

8. The information processing apparatus according to claim 1, wherein in a case where the execution request issued by the other application indicates the processing for acquiring information from the peripheral device, the operating system determines whether information about the peripheral device is cached, and in a case where the operating system determines that the information about the peripheral device is cached, the operating system transmits the cached information about the peripheral device to the other application.

9. The information processing apparatus according to claim 8,
wherein in a case where the execution request issued by the other application indicates processing for acquiring capability information about the peripheral device, the operating system transmits cached capability information about the peripheral device to the other application, and
wherein in a case where the execution request issued by the other application indicates processing for acquiring status information about the peripheral device, the operating system does not perform processing for responding to the other application.

10. A control method in an information processing apparatus having a printer driver including a Bidirectional (Bidi) Extension schema, the control method comprising:
receiving an occupation request associated with a definition file of the Bidi Extension schema for an exclusive access to a peripheral device from a first application;
determining whether the peripheral device is occupied by another application including a second application different from the first application, in a case where the occupation request associated with the definition file is received from the first application; and
executing occupation processing in an occupation period based on the occupation request associated with the definition file if it is determined that the peripheral device is not occupied by the other application, so that the first application is able to execute at least one of processing for acquiring information from the peripheral device and processing for transmitting information to the peripheral device, and that the other application including the second application is not able to execute processing for acquiring information from the peripheral device and processing for transmitting information to the peripheral device,
wherein the operating system stores identification information about the occupation processing in a storage area in a case where the occupation processing is executed,
wherein in a case where identification information about an execution request to be issued by the first application for executing at least one of the processing for acquiring information from the peripheral device and the processing for transmitting information to the peripheral device coincides with the identification information stored in the storage area, processing based on the execution request issued by the first application is executed, and
wherein in a case where identification information about an execution request to be issued by the other application including the second application does not coincide with the identification information stored in the storage area, processing based on the execution request issued by the other application is not executed.

11. The control method according to claim 10, wherein execution of the occupation processing is instructed to a port monitor of the operating system in the occupation period based on the occupation request, so that the first application is able to execute at least one of processing for acquiring information from the peripheral device and processing for transmitting information to the peripheral device, and that the second application is not able to execute processing for acquiring information from the peripheral device and processing for transmitting information to the peripheral device.

12. The control method according to claim 10, wherein the occupation processing is executed in accordance with a Bidi schema corresponding to the occupation request transmitted from the first application, and an object transmitted from the operating system.

13. The control method according to claim 10, wherein, when an occupation request is received from the second application in the occupation period, information that indicates an occupation processing error is transmitted to the second application.

14. The control method according to claim 10, further comprising determining, when an occupation end request is received, whether the first application issues the occupation end request,
wherein, when determination is made that the first application issues the occupation end request, the occupation processing is canceled.

15. The control method according to claim 14, wherein, when a predetermined time elapses after the occupation processing is executed, the occupation processing is canceled before the occupation end request is received.

16. A non-transitory storage medium that stores a control program readable by an information processing apparatus having an operating system, the control program configured to cause the information processing apparatus to execute:
a reception step of receiving an occupation request associated with a definition file in the printer driver for an exclusive access to a peripheral device from a first application;
a determination step of determining whether the peripheral device is occupied by another application including a second application different from the first application, in a case where the occupation request associated with the definition file is received from the first application; and
an execution step of executing occupation processing in an occupation period based on the occupation request associated with the definition file if it is determined that the peripheral device is not occupied by the other application, so that the first application is able to execute at least one of processing for acquiring information from the peripheral device and processing for transmitting information to the peripheral device, and that the other application including the second application is not able to execute processing for acquiring information from the peripheral device and processing for transmitting information to the peripheral device,
wherein the operating system stores identification information about the occupation processing in a storage area in a case where the occupation processing is executed,
wherein in a case where identification information about an execution request to be issued by the first application for executing at least one of the processing for acquiring information from the peripheral device and the processing for transmitting information to the peripheral device coincides with the identification information stored in the storage area, processing based on the execution request issued by the first application is executed, and wherein in a case where identification information about an execution request to be issued by the other application including the second application does not coincide with the identification information stored in the storage area, processing based on the execution request issued by the other application is not executed.

17. The storage medium according to claim 16, wherein execution of the occupation processing is instructed to a port monitor of the operating system in the occupation period based on the occupation request, so that the first application is able to execute at least one of processing for acquiring information from the peripheral device and processing for transmitting information to the peripheral device, and that the second application is not able to execute processing for acquiring information from the peripheral device and processing for transmitting information to the peripheral device.

18. The storage medium according to claim 16, wherein the occupation processing is executed in accordance with a Bidi schema corresponding to the occupation request transmitted from the first application, and an object transmitted from the operating system.

19. The storage medium according to claim 16, wherein, when an occupation request is received from the second application in the occupation period, information that indicates an occupation processing error is transmitted to the second application.

20. The storage medium according to claim 16, wherein, when the reception step comprises when receiving an occupation end request, a determination is made whether the first application issues the occupation end request, and when determination is made that the first application issues the occupation end request, the occupation processing is canceled.

21. The storage medium according to claim 20, wherein, when a predetermined time elapses after the occupation processing is executed, the occupation processing is canceled before the occupation end request is received.

* * * * *